United States Patent [19]

Baker et al.

[11] Patent Number: 4,781,843

[45] Date of Patent: Nov. 1, 1988

[54] CHEMICAL TREATMENT FOR ALGAE CONTROL IN OPEN WATER SYSTEMS

[75] Inventors: Gary L. Baker, Alexandria, Ky.; Ronald J. Christensen, Montgomery, Ohio

[73] Assignee: DuBois Chemicals, Inc., Cincinnati, Ohio

[21] Appl. No.: 131,902

[22] Filed: Dec. 11, 1987

[51] Int. Cl.$^4$ .............................................. C02F 1/50
[52] U.S. Cl. ..................... 210/764; 210/765; 71/67
[58] Field of Search ............... 71/67; 210/764, 765, 210/766

[56] References Cited

U.S. PATENT DOCUMENTS

| | | | |
|---|---|---|---|
| 3,928,575 | 12/1975 | Moyle et al. | 71/67 X |
| 4,242,119 | 12/1980 | Berrer et al. | 71/67 |
| 4,500,337 | 2/1985 | Young et al. | 71/67 |
| 4,530,120 | 7/1985 | Etani | 210/765 X |
| 4,552,752 | 11/1985 | Amick | 210/764 X |
| 4,710,220 | 12/1987 | Pischky | 71/67 |

*Primary Examiner*—Tom Wyse
*Attorney, Agent, or Firm*—Wood, Herron & Evans

[57] ABSTRACT

Algae growth in an open water system such as a water cooling tower is controlled by reducing the amount of light available for the algae to photosynthesize. The light available for photosynthesis is reduced by incorporating a dye into the water in the water cooling system. Thus the dye absorbs the light necessary for photosynthesis and in turn prevents algae growth. Preferably fluorescein at a concentration of 0.2 to 800 parts per million is incorporated into the water in the water cooling system. Other dyes can be selected depending on the particular algae.

11 Claims, 1 Drawing Sheet

CHEMICAL TREATMENT FOR ALGAE CONTROL IN OPEN WATER SYSTEMS

Open water systems most notably water cooling towers have a severe problem with algae. The portion of the system which is exposed to sunlight can easily develop algae growths. Carbon dioxide in the air and the light from the sunlight provide the necessary elements for photosynthesis and thus algae growth.

Algae growth can retard the heat exchange in the cooling system by reducing water flow rates through the cooling tower and can also provide a severe source of dispersed solids within the system. These can eventually foul a system to the extent that it is almost totally inoperative or that an over-flow of the tower deck results. There are various algacides and algastats which are typically added to water systems to control algae growth. These chemicals are generally complex chemicals such as quaternary ammonium compounds which may or may not be totally effective. Even with these compositions some water cooling towers become fouled with algae. This may require a shut down of the system and physical removal of the algae using various dangerous chemicals. The chemicals, physical labor and shut down time are exceptionally costly.

Algae growth is a problem only in systems where the water is exposed to sunlight. Sunlight is present because these systems by definition are open systems and require exposure to the environment for heat exchange purposes. Covering the system would prevent algae growth but would also reduce the efficiency of the system.

SUMMARY OF THE INVENTION

The present invention is premised on the realization that algae growth in an open water system can be substantially reduced or eliminated by shielding the algae from the light necessary for photosynthesis. More particularly the present invention is premised on the realization that the shielding of light from the algae can be accomplished by incorporating a dye into the water system wherein the concentration of the dye is controlled to substantially reduce the light required by the algae for photosynthesis.

More particularly, the present invention is premised on the realization that such a dye which can absorb 10% and preferably 50% or more of various wave lengths of light needed by the algae for photosynthesis over a 0.25-6 inch path can substantially reduce algae growth in water cooling towers. The dye can be a photodegradable dye which will not foul the environment. Thus spray from the water cooling tower will not permanently discolor any nearby surface. In particular, maintaining a concentration of fluorescein in the water system at from about 0.2 parts per million up to several hundred parts per million effectively reduces algae growth.

The advantages and objects of the present invention will be further appreciated in light of the following detailed description and drawing in which:

DETAILED DESCRIPTION

According to the present invention, a dye is added to the water in an open water system. By open water system we are referring to any water system in which any part of the water in the system is exposed to sunlight. Generally these will be recirculating water systems, i.e., cooling towers and evaporating towers. Primarily these systems will be water cooling towers used for building air conditioners. Such systems require a cooling tower where water is pumped to a distribution pan and passes over the tower fill down to a collection pan. The distribution pan will have a water depth of generally from about 0.25 to about 6 inches and generally 2-3 inches. Algae generally grows on the bottom surface of the distribution pan.

For use in the present invention the dye must absorb visible light specifically the light required for photosynthesis by algae. There are various types of algae including brown algae, red algae, blue green algae, filamentous algae and green algae. The present invention is concerned with all of these types of algae but primarily with green and blue green algae which photosynthesize using chlorophyll. Red algae absorbs blue light using a carotonoid pigment but also relies on chlorophyll.

Figure 1:
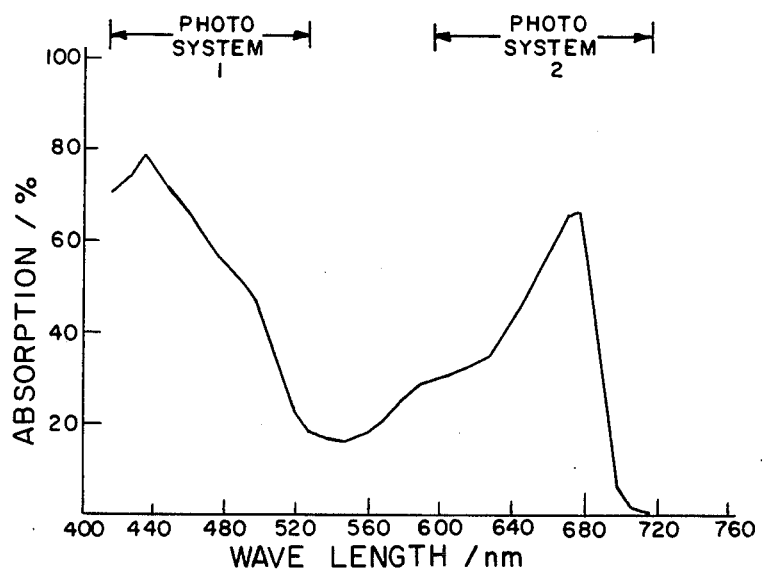
FIG. 1 is a graph of the action spectrum for green algae.

As shown in FIG. 1, the action spectrum of green algae peaks from about 400 to about 520 nm. Thus, chlorophyll is absorbing light between 400 and 520 nm referred to as photo system 1. There is a second peak between about 650 and 700 nm referred to as photo system 2. Thus, to retard green algae growth, the dye must be a dye which absorbs light between 400 and 520 nm or between 600 and 700 nm.

Red algae has a peak on its action spectrum between 460 and 680 nm corresponding to the absorption spectrum of phycoerythrin.

In an exposed water system, troublesome algae generally adhere to the bottom surface of the exposed portion of the water system. Thus, in a water cooling tower algae growth is noted most prominently in the bottom of the distribution pan. As indicated these distribution pans typically have 0.25 to 6 inches of water generally 2-3 inches. Thus, in order to be effective the concentration of the dye must be such that a substantial amount of the light required for photosynthesis is absorbed through the water in the distribution pan. Thus, it is preferred that the water in the distribution pan have an absorbance of 10% preferably at least about 50% at a wavelength between 420-520 nm. More preferably the absorbance should be 50%-100%.

Algae growth cycles vary depending on algae type and environment including pH, temperature, available light, and nutrients. To effectively retard algae growth, the fluorescein should be maintained at effective levels for a continuous period during system operation. Generally seven days continuous application will retard most algae. However, shorter intermittent periods of time should cause some detectable algae retardation. Of course, preferably the effective concentration should be maintained continuously.

Figure 2:
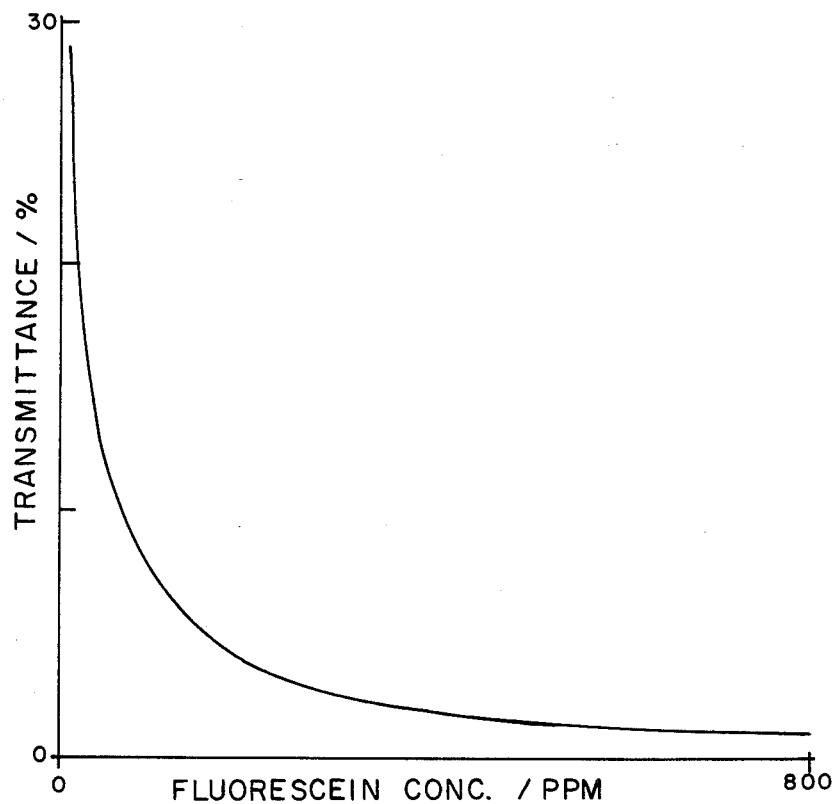
FIG. 2 is a graph depicting the transmittance of fluorescein at 500 nm relative to concentration level.

Preferred dyes for use in the present invention include fluorescein, Rhodamine B, Rhodamine WT and Lissamine FF. These dyes absorb light either in the red area of the spectrum toward 700 nm or as with fluorescein in the green sector of the spectrum at about 490-510 nm. Additionally, two dyes may be used which absorb at different wave lengths preferably one in photo-system 1 and the other in photo-system 2. The absorbance of fluorescein versus concentration is shown in FIG. 2. As can be seen, at about 800 parts per million fluorescein absorbance approaches 100%.

For algae control, the concentration of fluorescein is preferably from about 0.2 part per million to about 800 parts per million and preferably at least 1 ppm. Anything in excess of 800 ppm would be wasted. At a concentration of 3 part per million, the fluorescein will absorb approximately 60% of the light transmitted at 500 nm through 1 inch of the dye containing water. Thus, for a collection pan that is from 2 to 4 inches in depth a very substantial portion of that wave length of light is absorbed which in turn prevents or retards algae growth. This presents a unique opportunity.

For purposes of the present invention, fluorescein is actually the water soluble salt of fluorescein generally sodium fluorescein. This is a reaction product of phthalic anhydride and resorcinol which is subsequently neutralized with sodium hydroxide. It is also referred to as resorcinolphthlalein sodium; uranine, uranine yellow, CI acid yellow 73, CI45350.

The dye for use in the present invention is preferably one which is degradable by natural sunlight. A dye is photodegradable if at use concentrations after exposure to sunlight in a petrie dish (0.25–0.5 inches) for a period of about 3 hours the dye will no longer absorb visible light. Thus, the dye if blown from the exposed portion of the water system onto another surface will not permanently discolor the surface. Again fluorescein is the preferred dye for this purpose since it is photodegradable. This is also beneficial since the water from these cooling towers are continually bled off and discarded in the sewage system. Thus this will have no permanent effect on the water system.

Since fluorescein is photodegradable it will not maintain its concentration in a system indefinitely. Further the water in the system is periodically bled off. Therefore to insure that an effective concentration of fluorescein is present, the concentration of the fluorescein should be monitored using preferably a colorimeter.

The present invention is further advantageous because it can be used in combination with other algacides and algastats. Dyes used in the present invention are inert, do not absorb on solids or suspended matter and therefor do not interfere with the activity of other water treatment agents. Accordingly, these can be used in combination with any currently used algacide or algastat. These include: 2,2-dibromo-3-nitrilopropionamide, poly[oxyethylene(dimethyliminio)ethylene(dimethyliminio)-ethylene dichloride, 5-chlor-2-methyl-4-isothiazolin-3-one, 2-methyl-4-iosthiazolin-3-one, 2-(thiocyanomethylthio)benzothiazole and generally the class of linear alkyl substituted quaternary chloride compounds including, but not limited to the following: dioctyl dimethyl ammonium chloride, dimethyl benzyl ammonium chloride, didecyl dimethyl ammonium chloride.

Accordingly, the present invention provides a method of retarding or in certain cases stopping algae growth in open water systems. This is compatible with other water treatment methods and compositions excluding oxidants and therefore has a very substantial range of potential applications.

The present invention as well as the best mode of practicing this invention has been described.

However, the invention should only be limited by the appended claims in which we claim:

1. A method of retarding algae growth in water in an open water system, comprising:
    establishing a concentration of a dye in said water;
    wherein said dye is a water soluble dye which absorbs light at a wave length required by said algae to photosynthesize;
    wherein said concentration is established at an amount effective to substantially retard photosynthesis by algae.

2. The method claimed in claim 1 wherein said concentration is effective to absorb 10% of a wavelength of light at from 400 to about 520 nm through water exposed to sunlight in said system.

3. The method claimed in claim 2 wherein said dye is photodegradable.

4. The method claimed in claim 2 wherein said dye is fluorescein.

5. The method claimed in claim 4 wherein said concentration of fluorescein in said water system is established at about 0.2 to about 800 parts per million.

6. The method claimed in claim 5 wherein the said open water system is an open recirculating cooling tower.

7. The method claimed in claim 5 wherein said concentration is from about 1 to about 800 ppm.

8. The method claimed in claim 7 wherein said concentration is from 3 to about 50 ppm.

9. The method claimed in claim 1 wherein said dye is selected from the group consisting of fluorescein, Rhodamine B, Rhodamine WT and Lissamine FF.

10. The method claimed in claim 1 wherein a second algacide is added to said water.

11. The method claimed in claim 1 further comprising adding a second dye, said second dye comprising a water soluble dye which absorbs light at a wavelength required by said algae to photosynthesize.

* * * * *